United States Patent
Liu et al.

(10) Patent No.: US 10,817,449 B2
(45) Date of Patent: Oct. 27, 2020

(54) ADAPTION APPARATUS, AND DEVICE IDENTIFICATION METHOD AND APPARATUS

(71) Applicant: HUAWEI TECHNOLOGIES CO., LTD., Shenzhen, Guangdong (CN)

(72) Inventors: Feng Liu, Shenzhen (CN); Jiangtao Yang, Shanghai (CN); Jianjun Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/474,655

(22) PCT Filed: Apr. 11, 2017

(86) PCT No.: PCT/CN2017/080130
§ 371 (c)(1),
(2) Date: Jun. 28, 2019

(87) PCT Pub. No.: WO2018/120498
PCT Pub. Date: Jul. 5, 2018

(65) Prior Publication Data
US 2020/0004709 A1    Jan. 2, 2020

(30) Foreign Application Priority Data
Dec. 30, 2016  (CN) .......................... 2016 1 1262634

(51) Int. Cl.
*G06F 13/38* (2006.01)
*G06F 21/44* (2013.01)
(Continued)

(52) U.S. Cl.
CPC ............ *G06F 13/382* (2013.01); *G06F 21/44* (2013.01); *H01R 13/66* (2013.01); *G06F 2213/0042* (2013.01)

(58) Field of Classification Search
CPC .......... G06F 13/38; H02J 7/0045; H02J 7/007
See application file for complete search history.

(56) References Cited

U.S. PATENT DOCUMENTS

| 2012/0003854 A1 | 1/2012 | He | |
| 2014/0207977 A1* | 7/2014 | Hang | G06F 13/385 710/16 |

(Continued)

FOREIGN PATENT DOCUMENTS

| CN | 101340110 A | 1/2009 |
| CN | 201773967 U | 3/2011 |

(Continued)

OTHER PUBLICATIONS

Extended European Search Report issued in European Application No. 17886456.7 dated Nov. 20, 2019, 5 pages.

(Continued)

*Primary Examiner* — Getente A Yimer
(74) *Attorney, Agent, or Firm* — Fish & Richardson P.C.

(57) ABSTRACT

Example adaption apparatus are described. An example adaption apparatus includes a first USB interface and a second USB interface. A power signal of the first USB interface is electrically connected to a power signal of the second USB interface. A first channel configuration signal of the first USB interface is electrically connected to an ID signal of the second USB interface using a first resistor. The ID signal of the second USB interface is electrically connected to the power signal of the second USB interface using a second resistor. A resistance value of the first resistor meets a criterion followed by a first device to identify a UFP device according to the USB Type-C protocol. A sum of the resistance value of the first resistor and a resistance value of (Continued)

the second resistor meets a criterion followed by the first device to identify a DFP device according to the USB Type-C protocol.

4 Claims, 5 Drawing Sheets

(51) Int. Cl.
*H01R 13/66* (2006.01)
*G06F 13/40* (2006.01)
*G06F 13/42* (2006.01)

(56) References Cited

U.S. PATENT DOCUMENTS

| | | | |
|---|---|---|---|
| 2016/0127671 A1* | 5/2016 | Hundal | G06F 13/4247 348/723 |
| 2016/0188520 A1 | 6/2016 | Lei et al. | |
| 2016/0217103 A1* | 7/2016 | Kim | G06F 13/4282 |
| 2017/0222459 A1* | 8/2017 | Kang | H02J 7/0045 |
| 2018/0032451 A1* | 2/2018 | Hundal | G06F 13/126 |
| 2019/0235593 A1* | 8/2019 | Wang | G06F 13/4282 |

FOREIGN PATENT DOCUMENTS

| | | |
|---|---|---|
| CN | 104023294 A | 9/2014 |
| CN | 204946001 U | 1/2016 |
| CN | 205178219 U | 4/2016 |
| CN | 105867593 A | 8/2016 |
| CN | 205565238 U | 9/2016 |
| EP | 2278668 B1 | 4/2014 |
| EP | 3104280 A1 | 12/2016 |

OTHER PUBLICATIONS

Campbell et al., "Transition Existing Products from USB 2.0 OTG to USB Type-C." Texas Instruments, dated Jul. 2015, 6 pages.
Office Action issued in Chinese Application No. 201780005422.X dated Mar. 1, 2019, 15 pages (with English translation).
PCT International Search Report and Written Opinion issued in International Application No. PCT/CN2017/080130 dated Oct. 9, 2017, 20 pages (with English translation).

* cited by examiner

ADAPTION APPARATUS, AND DEVICE IDENTIFICATION METHOD AND APPARATUS

CROSS-REFERENCE TO RELATED APPLICATIONS

This application is a National Stage of International Application No. PCT/CN2017/080130, filed on Apr. 11, 2017, which claims priority to Chinese Patent Application No. 201611262634.X, filed on Dec. 30, 2016. Both of the aforementioned applications are hereby incorporated by reference in their entireties.

TECHNICAL FIELD

This application relates to the data processing field, and in particular, to an adaption apparatus, a device identification method, and a device identification apparatus.

BACKGROUND

An electronic product usually uses an interface for charging, data connection to another peripheral device, and so on. As electronic products are diversified, interface types of electronic devices are also diversified. To implement connection between electronic devices using different interfaces, a device referred to as an adaption apparatus is usually used. The adaption apparatus may connect interfaces of different standards, to implement interconnection between two electronic devices.

In the prior art, a first device may be connected to a second device by using an adaption apparatus. In this case, a USB Type-C interface of the adaption apparatus is connected to the first device, and a micro-USB interface is connected to the second device. After the connection, the first device needs to implement DFP and UFP functions to identify the second device. However, the USB Type-C (Universal Serial Bus Type-C, Universal Serial Bus Type-C, Type-C for short) protocol does not define adaptation of the USB Type-C interface to the micro-USB (MICRO—Universal Serial Bus, micro-universal serial bus) interface. The first device needs to identify a DFP device and a UFP device by using a same adaption apparatus. However, DFP and UFP functions of a current market-available adaption apparatus that adapts the USB Type-C interface to the micro-USB interface are not implemented completely in accordance with the USB Type-C protocol. Therefore, in the same adaption apparatus, the first device cannot simultaneously identify the DFP (Downstream Facing-Port, downstream facing port) device and the UFP (Upstream Facing-Port, upstream facing port) device according to the USB Type-C protocol, thereby imposing a limitation on use by a user.

SUMMARY

Embodiments of this application provide an adaption apparatus, a device identification method, and a device identification apparatus, so that using a same adaption apparatus, a first device can simultaneously identify a DFP device and a UFP device according to the USB Type-C protocol.

To achieve the foregoing objective, the embodiments of this application use the following technical solutions:

According to a first aspect, an adaption apparatus is provided, including a first USB interface and a second USB interface, where the first USB interface is a USB Type-C interface and the second USB interface includes an identification ID (identification, identification) pin; a power signal pin VBUS of the first USB interface is electrically connected to a power signal pin VBUS of the second USB interface; a first channel configuration signal pin of the first USB interface is electrically connected to the ID pin of the second USB interface using a first resistor; the ID pin of the second USB interface is electrically connected to the power signal pin VBUS of the second USB interface using a second resistor; a resistance value of the first resistor meets a criterion followed by a first device to identify a UFP device according to the USB Type-C protocol, a sum of the resistance value of the first resistor and a resistance value of the second resistor meets a criterion followed by the first device to identify a DFP device according to the USB Type-C protocol, and the first device is a device comprising a USB Type-C interface. In the foregoing solution, the first USB interface is a USB Type-C interface and may be electrically connected to the first device, and the second USB device may be electrically connected to a second device. Based on the connection relationship, the first resistor is serially connected between the first channel configuration signal pin of the first USB interface and the ID pin of the second USB interface, and the first resistor and the second resistor are serially connected between the first channel configuration signal pin of the first USB interface and the power signal pin VBUS of the second USB interface. In addition, the resistance value of the first resistor meets the criterion followed by the first device to identify a UFP device according to the USB Type-C protocol, and the sum of the resistance value of the first resistor and the resistance value of the second resistor meets the criterion followed by the first device to identify a DFP device according to the USB Type-C protocol. Therefore, the adaption apparatus allows the first device to simultaneously identify a DFP device and a UFP device according to the USB Type-C protocol.

With reference to the first aspect, in a first possible implementation, the adaption apparatus is electrically connected to a USB interface of the first device using the first USB interface, the adaption apparatus is electrically connected to a USB interface of the second device using the second USB interface, the ID pin of the second USB interface is electrically connected to an ID pin of the USB interface of the second device using the adaption apparatus, and when the ID pin of the USB interface of the second device is floating on a second device side, the first device identifies the second device as a DFP device, or when the ID pin of the USB interface of the second device is grounded on a second device side, the first device identifies the second device as a UFP device. When the first device and the second device are respectively connected to the first and the second USB interfaces of the adaption apparatus, and when the ID pin of the USB interface of the second device is floating on the second device side, the first resistor and the second resistor are serially connected between the first channel configuration signal pin of the first USB interface and the power signal pin VBUS of the second USB interface, and pull up a voltage of the first channel configuration signal pin, and the first device may identify the second device as a DFP device according to the USB Type-C protocol. When the first device and the second device are respectively connected to the first and the second USB interfaces of the adaption apparatus, and when the ID pin of the USB interface of the second device is grounded on the second device side, the first resistor is serially connected between the first channel configuration signal pin of the first USB interface and the ID pin of the second USB interface, is grounded using the ID pin of second USB interface, and pulls down a voltage of the first channel configuration signal pin, and the first device may identify the second device, inserted into the second USB interface of the adaption apparatus, as a UFP device according to the USB Type-C protocol.

With reference to the first aspect, in a second possible implementation, the resistance value of the first resistor is 5.1×(1±a) KΩ, and the resistance value of the second resistor is 51×(1±b) KΩ, where a □ [0,0.2] and b □ [0,0.2]. For example, the resistance value of the first resistor is 5.1 KΩ, and the resistance value of the second resistor is 51 KΩ.

With reference to the first aspect, in a third possible implementation, a second channel configuration signal pin of the first USB interface is floating. The first channel configuration signal pin is a channel configuration signal pin CC1 of a USB Type-C interface in the USB Type-C protocol, and the second channel configuration signal pin is a channel configuration signal pin CC2 of the USB Type-C interface in the USB Type-C protocol; or the first channel configuration signal pin is a channel configuration signal pin CC2 of a USB Type-C interface in the USB Type-C protocol, and the second channel configuration signal pin is a channel configuration signal pin CC1 of the USB Type-C interface in the USB Type-C protocol. The USB Type-C interface includes two channel configuration signal pins (the CC1 and the CC2), where both the CC1 and the CC2 may serve as the first channel configuration signal pin to implement the solution in the first aspect. This improves flexibility of implementing a structure of the adaption apparatus.

With reference to the first aspect, in a fourth possible implementation, a first data signal pin D+ of the first USB interface is electrically connected to a first data signal pin D+ of the second USB interface; and a second data signal pin D− of the first USB interface is electrically connected to a second data signal pin D− of the second USB interface.

With reference to the first aspect, in a fifth possible implementation, the second USB interface includes a micro-USB interface or a mini-USB interface.

In addition, the first USB interface of the adaption apparatus is a male interface or a female interface, and the second USB interface is a male interface or a female interface. It may be understood that when the first USB interface is a male interface, the USB interface of the first device is a female interface, or when the first USB interface is a female interface, the USB interface of the first device is a male interface; and when the second USB interface is a male interface, the USB interface of the second device is a female interface, or when the second USB interface is a female interface, the USB interface of the second device is a male interface.

According to a second aspect, a device identification method using the adaption apparatus in the first aspect or any implementation of the first aspect is provided, including: when the adaption apparatus is electrically connected to a second device using a second USB interface, and the adaption apparatus is electrically connected to a first device using a first USB interface, identifying, by the first device, the second device as a UFP device or a DFP device based on an equivalent electrical parameter of a first channel configuration signal pin of the first device. In the foregoing solution, the first USB interface is a USB Type-C interface and may be electrically connected to the first device, and the second USB device may be electrically connected to the second device. Based on the connection relationship, a first resistor is serially connected between the first channel configuration signal pin of the first USB interface and an ID pin of the second USB interface, and the first resistor and a second resistor are serially connected between the first channel configuration signal pin of the first USB interface and a power signal pin VBUS of the second USB interface. In addition, a resistance value of the first resistor meets a criterion followed by the first device to identify a UFP device according to the USB Type-C protocol, and a sum of the resistance value of the first resistor and a resistance value of the second resistor meets a criterion followed by the first device to identify a DFP device according to the USB Type-C protocol. Therefore, when the adaption apparatus is electrically connected to the second device using the second USB interface, and when the adaption apparatus is electrically connected to the first device using the first USB interface, the first device identifies the second device as a UFP device or a DFP device based on the equivalent electrical parameter of the first channel configuration signal pin of the first device. Therefore, the adaption apparatus allows the first device to simultaneously identify a DFP device and a UFP device according to the USB Type-C protocol.

With reference to the second aspect, in a first possible implementation, the equivalent electrical parameter of the first channel configuration signal pin includes one or more of the following: a resistance value of an equivalent resistor serially connected to the first channel configuration signal pin, a voltage of the first channel configuration signal pin, and/or a current passing the first channel configuration signal pin.

With reference to the second aspect, in a second possible implementation, the identifying, by the first device, the second device as a UFP device or a DFP device based on an equivalent electrical parameter of a first channel configuration signal pin of the first device includes: identifying, by the first device, the second device as a UFP device or a DFP device based on the resistance value of the equivalent resistor serially connected to the first channel configuration signal pin, where the equivalent electrical parameter of the first channel configuration signal pin is the resistance value of the equivalent resistor serially connected to the first channel configuration signal pin; and the first device determines, based on the voltage of the first channel configuration signal pin and the current passing the first channel configuration signal pin, the resistance value of the equivalent resistor serially connected to the first channel configuration signal pin.

A specific implementation is: The identifying, by the first device, the second device as a UFP device or a DFP device based on an equivalent electrical parameter of a first channel configuration signal pin of the first device includes: identifying, by the first device, the second device as a UFP device when the resistance value of the equivalent resistor serially connected to the first channel configuration signal pin is a first resistance value, where the first resistance value meets a criterion followed by the first device to identify a UFP device according to the USB Type-C protocol. A specific implementation is: The identifying, by the first device, the second device as a UFP device or a DFP device based on an equivalent electrical parameter of a first channel configuration signal pin of the first device includes: identifying, by the first device, the second device as a UFP device when an ID pin of a USB interface of the second device is grounded on a second device side. When the first device and the second device are respectively connected to the first and the second USB interfaces of the adaption apparatus, and when the ID pin of the USB interface of the second device is grounded on the second device side, the first resistor is serially connected between the first channel configuration signal pin of the first USB interface and an ID pin of the second USB interface, is grounded using the ID pin of the second USB interface, and pulls down the voltage of the first channel configuration signal pin, and the first device may identify the second device, inserted into the second USB interface of the adaption apparatus, as a UFP device according to the USB Type-C protocol.

A specific implementation is: The identifying, by the first device, the second device as a UFP device or a DFP device based on an equivalent electrical parameter of a first channel configuration signal pin of the first device includes: identifying, by the first device, the second device as a DFP device when the resistance value of the equivalent resistor serially connected to the first channel configuration signal pin is a second resistance value, where the second resistance value meets a criterion followed by the first device to identify a DFP device according to the USB Type-C protocol. A specific implementation is: The identifying, by the first device, the second device as a UFP device or a DFP device based on an electrical parameter includes: identifying, by the first device, the second device as a DFP device when an ID pin of a USB interface of the second device is floating on a second device side. When the first device and the second device are respectively connected to the first and the second USB interfaces of the adaption apparatus, and when the ID pin of the USB interface of the second device is floating on the second device side, the first resistor and the second resistor are serially connected between the first channel configuration signal pin of the first USB interface and the power signal pin VBUS of the second USB interface, and pull up the voltage of the first channel configuration signal pin, and the first device may identify the second device as a DFP device according to the USB Type-C protocol.

In addition, the first device supplies power to the UFP device when identifying the second device as a UFP device. The first device displays prompt information about charging or data service transmission on a display screen of the first device when identifying the second device as a DFP device.

With reference to the second aspect, in a third possible implementation, when the adaption apparatus is electrically connected to the first device using the first USB interface, and before the adaption apparatus is electrically connected to the second device using the second USB interface, the method further includes: obtaining, by the first device, a floating state of the first channel configuration signal pin. In a process of using the adaption apparatus, if the first USB interface of the adaption apparatus is first electrically connected to the first device, the first device obtains the floating state of the first channel configuration signal pin. In this case, insertion of the adaption apparatus does not affect the first device. Thereafter, after the second USB interface of the adaption apparatus is electrically connected to the second device, the first device identifies the second device according to the foregoing solution. However, if the second USB interface of the adaption apparatus is first electrically connected to the second device, and then the first USB interface of the adaption apparatus is electrically connected to the first device, the first device directly identifies the second device according to the foregoing solution. Therefore, regardless of which interface of the adaption apparatus is first electrically connected to a corresponding peripheral device, identifying a DFP device and a UFP device by the first device according to the USB Type-C protocol is not affected.

According to a third aspect, a device identification apparatus is provided, including: an obtaining unit, configured to: when a second USB interface of the adaption apparatus is inserted to a second device, and when a first USB interface of the adaption apparatus is inserted to a first device, obtain an electrical parameter of a first channel configuration signal pin; and a processing unit, configured to identify the second device based on the electrical parameter obtained by the obtaining unit. In the foregoing solution, the first USB interface of the adaption apparatus is a USB Type-C interface and may be connected to the first device, and the second USB device of the adaption apparatus may be connected to the second device. Based on the connection relationship, a first resistor is serially connected between the first channel configuration signal pin of the first USB interface and an ID pin of the second USB interface, and the first resistor and a second resistor are serially connected between the first channel configuration signal pin of the first USB interface and a power signal pin VBUS of the second USB interface. In addition, a resistance value of the first resistor meets a criterion followed by the first device to identify a UFP device according to the Type-C protocol, and a sum of the resistance value of the first resistor and a resistance value of the second resistor meets a criterion followed by the first device to identify a DFP device according to the USB Type-C protocol. Therefore, when the second USB interface of the adaption apparatus is inserted into the second device and when the first USB interface of the adaption apparatus is inserted into the first device, the first device obtains the electrical parameter of the first channel configuration signal pin, and the first device identifies the second device based on the electrical parameter. Therefore, the adaption apparatus allows the first device to simultaneously identify a DFP device and a UFP device according to the USB Type-C protocol. Based on a same inventive concept, for a principle of resolving a problem and a beneficial effect of the apparatus, refer to the first aspect, the possible method implementations of the first aspect, and the beneficial effects. Therefore, for implementation of the apparatus, refer to the first aspect and the possible method implementations of the first aspect. Details are not repeated.

According to a fourth aspect, an embodiment of this application provides a device identification apparatus, including a processor, a memory, a bus, and an interface circuit, where the memory is configured to store a computer executable instruction, the interface circuit, the processor, and the memory are connected using the bus, and when the first device runs, the processor executes the computer executable instruction stored in the memory, so that the first device executes any device identification method in the first aspect. Based on a same inventive concept, the processor invokes the instruction stored in the memory to implement the solution in the first aspect and the possible method designs of the first aspect. For an implementation of resolving a problem and a beneficial effect of the apparatus, refer to the first aspect, the possible method implementations of the first aspect, and the beneficial effects. Therefore, for implementation of the terminal, refer to the method implementations. Details are not repeated.

According to a fifth aspect, an embodiment of this application provides a computer storage medium, including an instruction, where when the instruction runs on a computer, the computer executes any device identification method in the first aspect.

According to a sixth aspect, an embodiment of this application provides a computer program product including an instruction, where when the instruction runs on a computer, the computer executes any device identification method in the first aspect.

BRIEF DESCRIPTION OF DRAWINGS

To describe the technical solutions in the embodiments of this application more clearly, the following briefly describes the accompanying drawings required for describing the embodiments or the prior art.

DESCRIPTION OF EMBODIMENTS

The following describes the embodiments of this application with reference to accompanying drawings.

Figure 1:
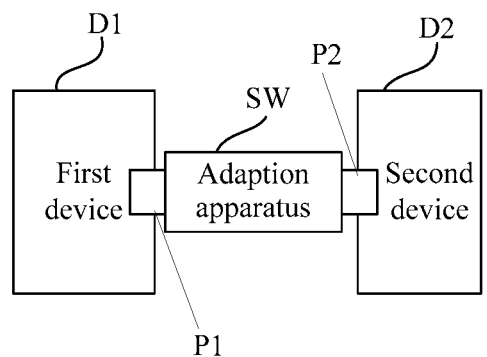
FIG. 1 is a schematic diagram of an application scenario of an adaption apparatus according to an embodiment of this application.

Interconnection between electronic devices usually requires adaptation by using an adaption apparatus. This is because interface types of electronic products are diversified, and the adaption apparatus may adapt interfaces of different standards. As shown in FIG. 1, an adaption apparatus provided in an embodiment of this application is generally applied in the following scenario. In this scenario, a first device D1 and a second device D2 implement device interconnection by using an adaption apparatus SW. In a specific implementation of this application, a Universal Serial Bus (Universal Serial Bus, USB) interface of the first device D1 is a Universal Serial Bus Type-C (Universal Serial Bus Type-C, USB Type-C) interface, a USB interface of the second device D2 is a USB interface including an identification ID pin, and the adaption apparatus SW has two USB interfaces: a first USB interface P1 and a second USB interface P2, where the first USB interface P1 is a USB Type-C interface, and the second USB interface P2 is a USB interface including an ID identification pin. The first device D1 is connected to the first USB interface P1 of the adaption apparatus SW by using the USB Type-C interface, and the second device D2 is connected to the second USB interface P2 of the adaption apparatus SW by using the USB interface. The first device D1 identifies the second device D2 as an upstream facing port (Upstream Facing Port, UFP) device or a downstream facing port (Downstream Facing Port, DFP) device according to the USB Type-C protocol. It may be understood that the first USB interface P1 of the adaption apparatus SW is a male interface or a female interface, and the second USB interface P2 is a male interface or a female interface. When the first USB interface P1 is a male interface, the USB interface of the first device is a female interface matching the first USB interface P1; or when the first USB interface P1 is a female interface, the USB interface of the first device is a male interface matching the first USB interface P1. When the second USB interface P2 is a male interface, the USB interface of the second device is a female interface matching the second USB interface P2; or when the second USB interface P2 is a female interface, the USB interface of the second device is a male interface matching the second USB interface P2.

Figure 2:
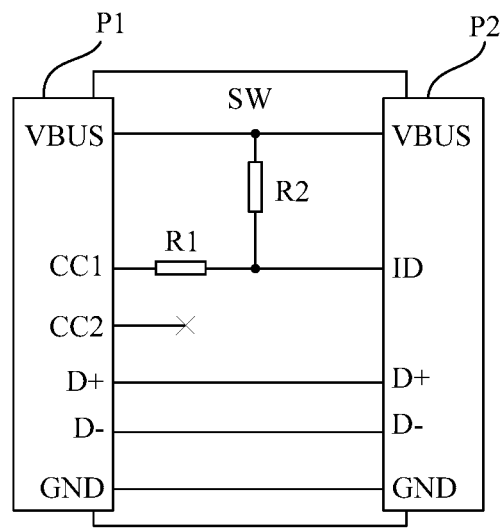
FIG. 2 is a schematic structural diagram of an adaption apparatus according to an embodiment of this application.
Figure 3:
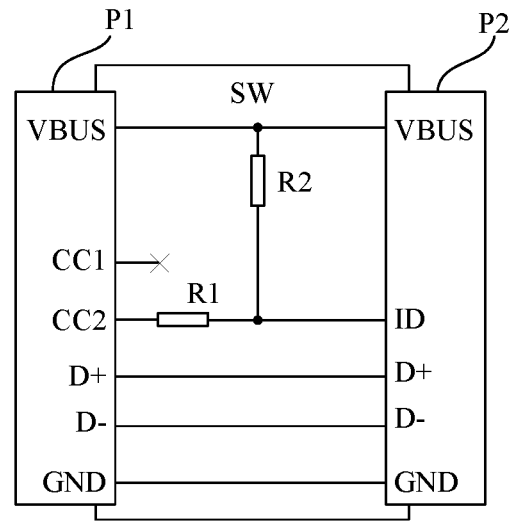
FIG. 3 is a schematic structural diagram of an adaption apparatus according to another embodiment of this application.

Specifically, as shown in FIG. 1, FIG. 2, and FIG. 3, an embodiment of this application provides an adaptation apparatus SW applied to the scenario shown in FIG. 1. The adaptation apparatus SW includes a first USB interface P1 and a second USB interface P2, where the first USB interface P1 is a USB Type-C interface and the second USB interface P2 includes an identification ID pin. For example, the second USB interface P2 may be a micro-USB interface or a mini-USB interface. The first USB interface P1 is used to connect a first device, and the second USB interface P2 is used to connect a second device that has a USB interface with an identification ID pin.

A power signal pin VBUS of the first USB interface P1 is electrically connected to a power signal pin VBUS of the second USB interface P2; a first channel configuration signal pin (CC1/CC2) of the first USB interface P1 is electrically connected to the identification ID pin of the second USB interface P2 by using a first resistor R1; and the ID pin of the second USB interface P2 is electrically connected to the power signal pin VBUS of the second USB interface P2 by using a second resistor R2.

A resistance value of the first resistor R1 meets a criterion followed by the first device to identify a UFP device according to the USB Type-C protocol, and a sum of the resistance value of the first resistor R1 and a resistance value of the second resistor R2 meets a criterion followed by the first device to identify a DFP device according to the USB Type-C protocol.

In addition, as shown in FIG. 2 and FIG. 3, a second channel configuration signal pin (CC2/CC1) of the first USB interface P1 is floating. This embodiment of this application provides the following two specific implementations.

Manner 1: As shown in FIG. 2, the first channel configuration signal pin is a channel configuration signal pin CC1 of a USB Type-C interface in the USB Type-C protocol, and the second channel configuration signal pin is a channel configuration signal pin CC2 of the Type-C interface in the USB Type-C protocol.

Manner 2: As shown in FIG. 3, the first channel configuration signal pin is a channel configuration signal pin CC2 of a USB Type-C interface in the USB Type-C protocol, and the second channel configuration signal pin is a channel configuration signal pin CC1 of the Type-C interface in the Type-C protocol. In this case, the USB Type-C interface includes two channel configuration signal pins (the CC1 and the CC2), where both the CC1 and the CC2 may serve as the first channel configuration signal pin to implement the solution in the first aspect. This improves flexibility of structural implementation of the adaption apparatus.

Figure 4:
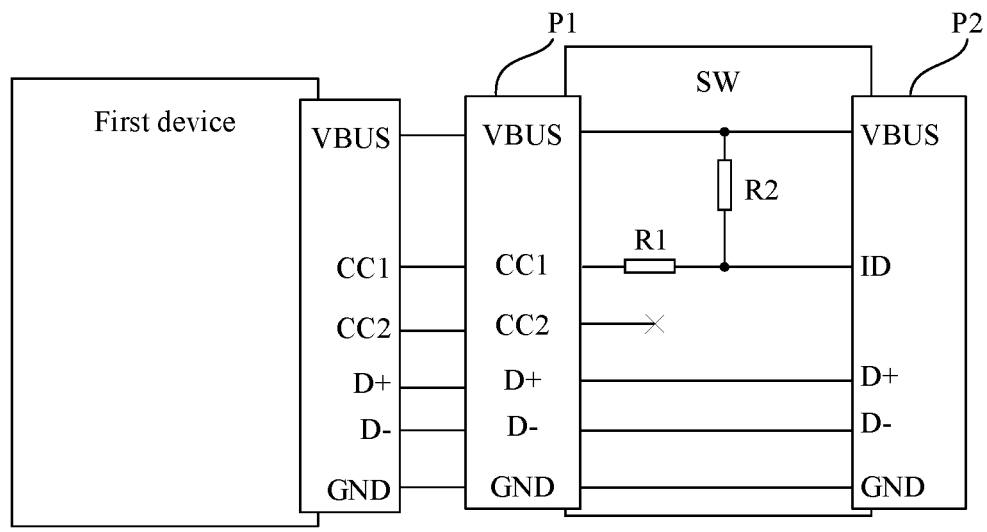
FIG. 4 is a schematic diagram of a mode of connecting a first device and an adaption apparatus according to an embodiment of this application.
Figure 5:
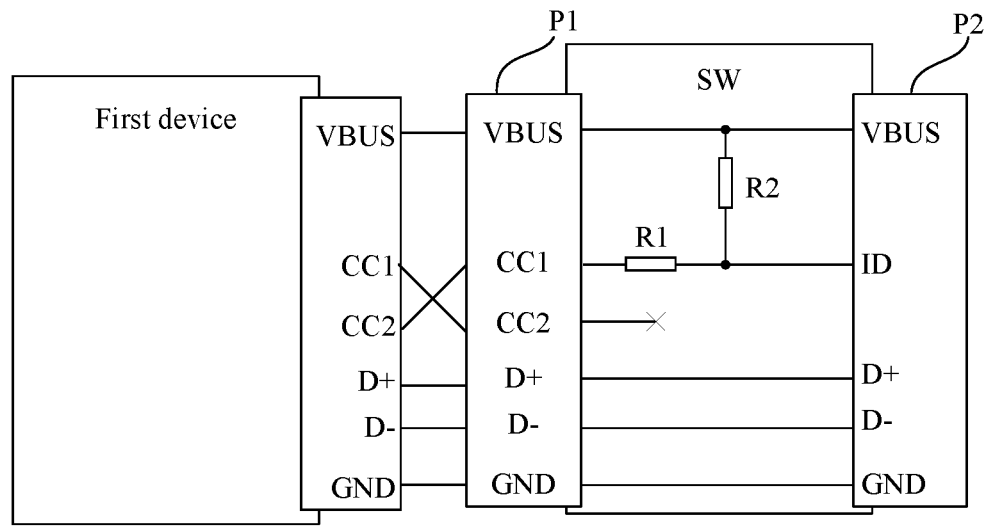
FIG. 5 is a schematic diagram of a mode of connecting a first device and an adaption apparatus according to another embodiment of this application.

In addition, pins of the USB Type-C interface are designed to be symmetric. Therefore, when the first device is connected to the second device by using the adaption apparatus, and when the first device is forward connected to the adaption apparatus, a CC1 in a USB Type-C interface of the first device is electrically connected to the CC1 in the USB Type-C interface of the adaption apparatus, and a CC2 in the USB Type-C interface of the first device is electrically connected to the CC2 in the USB Type-C interface of the adaption apparatus, as shown in FIG. 4. When the first device is connected to the second device by using the adaption apparatus, and when the first device is reversely connected to the adaption apparatus, a CC1 in a USB Type-C interface of the first device is electrically connected to the CC2 in the USB Type-C interface of the adaption apparatus, and a CC2 in the USB Type-C interface of the first device is electrically connected to the CC1 in the USB Type-C interface of the adaption apparatus, as shown in FIG. 5.

In the manner 1, when the first device is forward connected to the adaption apparatus, the first device may identify a type of the second device by using the pin CC1; or when the first device is reversely connected to the adaption apparatus, the first device may identify a type of the second device by using the pin CC2. In the manner 2, when the first device is forward connected to the adaption apparatus, the first device may identify a type of the second device by using the pin CC2; or when the first device is reversely connected to the adaption apparatus, the first device may identify a type of the second device by using the pin CC1.

In addition, for details about a mode of connecting other pins in the first USB interface P1 and the second USB interface P2, refer to FIG. 2 and FIG. 3, where the first USB interface may have other pins, and for ease of description, they are not shown in this embodiment of this application or the accompanying drawings. A specific connection mode is as follows.

A first data signal pin D+ of the first USB interface P1 is connected to a first data signal pin D+ of the second USB interface P2, and a second data signal pin D− of the first USB interface P1 is connected to a second data signal pin D− of the second USB interface P2. In addition, the first USB interface P1 further includes a grounding pin GND, and the second USB interface P2 further includes a grounding pin GND used for grounding.

Figure 6:
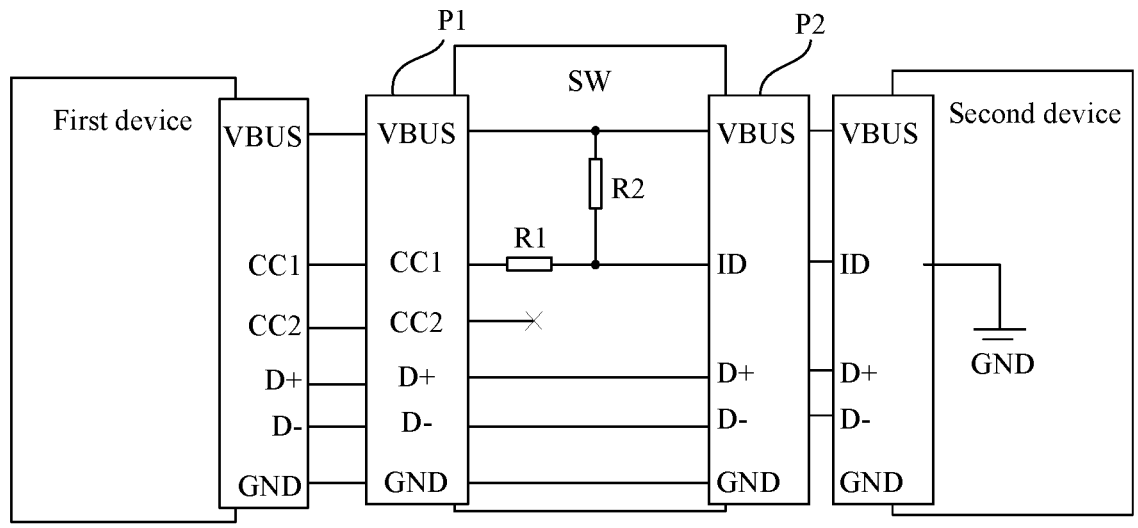
FIG. 6 is a schematic diagram of a mode of connecting a first device and a second device by using an adaption apparatus according to an embodiment of this application.
Figure 7:
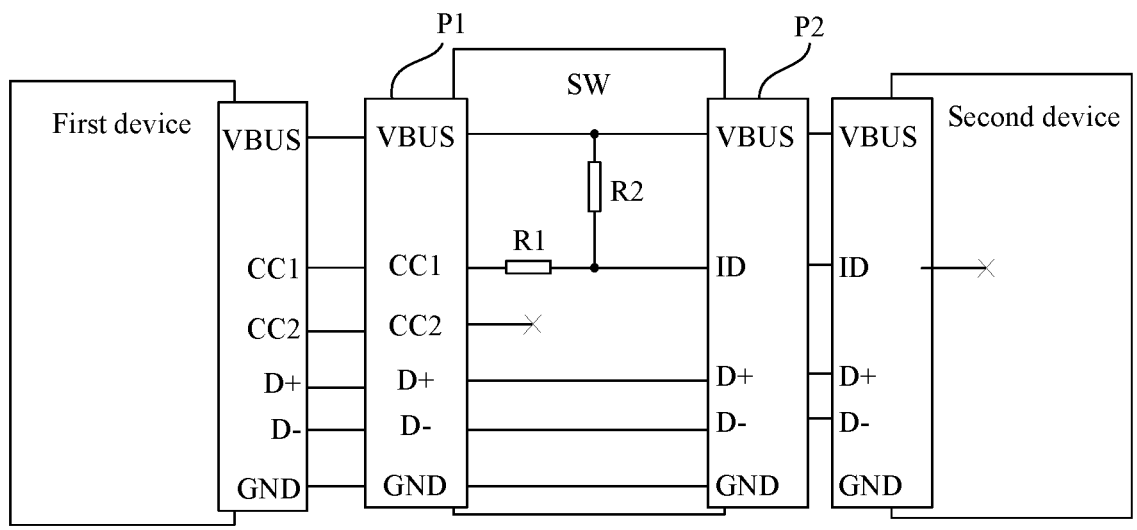
FIG. 7 is a schematic diagram of a mode of connecting a first device and a second device by using an adaption apparatus according to another embodiment of this application.

The adaption apparatus is electrically connected to a USB interface of the first device by using the first USB interface, the adaption apparatus is electrically connected to a USB interface of the second device by using the second USB interface, and the ID pin of the second USB interface is electrically connected to an ID pin of the USB interface of the second device by using the adaption apparatus. The ID pin of the USB interface of the second device includes two states: floating (x) or grounded (GND). The two states respectively represent two states of the second device. For example, the USB interface of the second device is a micro-USB interface. As shown in FIG. 6, the ID pin of the USB interface of the second device is grounded GND, and the USB interface of the second device is a type-A micro-USB interface. When the USB interface of the second device is electrically connected to the second USB interface of the adaption apparatus, the first device identifies the second device as a UFP device. As shown in FIG. 7, the ID pin of the USB interface of the second device is floating (x), and the USB interface of the second device is a type-B micro-USB interface. When the USB interface of the second device is electrically connected to the second USB interface of the adaption apparatus, the first device identifies the second device as a DFP device. An ID pin of a mini-USB interface has a similar function as an ID pin of a micro-USB interface. Details are not repeated herein.

Therefore, when the USB interface of the second device is electrically connected to the second USB interface of the adaption apparatus, and when the ID pin of the USB interface of the second device is floating on a second device side, the first device identifies the second device as a DFP device. When the ID pin of the USB interface of the second device is grounded on a second device side, the first device identifies the second device as a UFP device.

When the first device and the second device are respectively connected to the first and the second USB interfaces of the adaption apparatus, and when the ID pin of the USB interface of the second device is floating on the second device side, the first resistor and the second resistor are serially connected between the first channel configuration signal pin of the first USB interface and the power signal pin VBUS of the second USB interface, and pull up a voltage of the first channel configuration signal pin, and the first device may identify the second device as a DFP device according to the USB Type-C protocol.

When the first device and the second device are respectively connected to the first and the second USB interfaces of the adaption apparatus, and when the ID pin of the USB interface of the second device is grounded on the second device side, the first resistor is serially connected between the first channel configuration signal pin of the first USB interface and the ID pin of the second USB interface, is grounded by using the ID pin of the second USB interface, and pulls down a voltage of the first channel configuration signal pin, and the first device may identify the second device, inserted into the second USB interface of the adaption apparatus, as a UFP device according to the USB Type-C protocol.

In addition, as specified in the USB Type-C protocol, the resistance value of the first resistor is designed to be 5.1× (1±a) KΩ, and the resistance value of the second resistor is 51×(1±b) KΩ, where a $\in$ [0,0.2] and b $\in$ [0,0.2]. For example, the resistance value of the first resistor R1 is 5.1 KΩ, and the resistance value of the second resistor R2 is 51 KΩ.

In the foregoing solution, the first USB interface is a USB Type-C interface and may be electrically connected to the first device, and the second USB device may be electrically connected to the second device. Based on the connection relationship, the first resistor is serially connected between the first channel configuration signal pin of the first USB interface and the ID pin of the second USB interface, and the second resistor is serially connected between the ID pin of the second USB interface and the power signal pin VBUS of the second USB interface. In addition, the resistance value of the first resistor meets the criterion followed by the first device to identify a UFP device according to the USB Type-C protocol, and the sum of the resistance value of the first resistor and the resistance value of the second resistor meets the criterion followed by the first device to identify a DFP device according to the USB Type-C protocol. Therefore, when the ID pin of the USB interface of the second device is floating on the second device side, the first device identifies the second device as a DFP device; or when the ID pin of the USB interface of the second device is grounded on the second device side, the first device identifies the second device as a UFP device. Therefore, the adaption apparatus allows the first device to simultaneously identify a DFP device and a UFP device according to the USB Type-C protocol.

Based on the adaption apparatus provided above, an embodiment of this application provides a device identification method using the adaption apparatus. The method includes the following steps.

101: When the adaption apparatus is electrically connected to a second device by using a second USB interface, and when the adaption apparatus is electrically connected to a first device by using a first USB interface, the first device identifies the second device as a UFP device or a DFP device based on an equivalent electrical parameter of a first channel configuration signal pin of the first device.

The equivalent electrical parameter of the first channel configuration signal pin includes one or more of the following: a resistance value of an equivalent resistor serially connected to the first channel configuration signal pin, a voltage of the first channel configuration signal pin, and/or a current passing the first channel configuration signal pin.

Step 101 specifically includes: identifying, by the first device, the second device as a UFP device or a DFP device based on the resistance value of the equivalent resistor serially connected to the first channel configuration signal pin, where the equivalent electrical parameter of the first channel configuration signal pin is the resistance value of the equivalent resistor serially connected to the first channel configuration signal pin, and the first device determines, based on the voltage of the first channel configuration signal pin and the current passing the first channel configuration signal pin, the resistance value of the equivalent resistor serially connected to the first channel configuration signal pin; and/or identifying, by the first device, the second device as a UFP device or a DFP device based on the voltage of the first channel configuration signal pin; and/or identifying, by the first device, the second device as a UFP device or a DFP device based on the current passing the first channel configuration signal pin; and/or identifying, by the first device, the second device as a UFP device or a DFP device based on the voltage of the first channel configuration signal pin and the current passing the first channel configuration signal pin; and/or identifying, by the first device, the second device as a UFP device or a DFP device based on the resistance value of the equivalent resistor serially connected to the first channel configuration signal pin and the current passing the first channel configuration signal pin; and/or identifying, by the first device, the second device as a UFP device or a DFP device based on the resistance value of the equivalent resistor serially connected to the first channel configuration signal pin and the voltage of the first channel configuration signal pin; and/or identifying, by the first device, the second device as a UFP device or a DFP device based on the resistance value of the equivalent resistor serially connected to the first channel configuration signal pin, the voltage of the first channel configuration signal pin, and/or the current passing the first channel configuration signal pin.

The following provides description by using an example in which the first device identifies the second device as a UFP device or a DFP device based on the resistance value of the equivalent resistor serially connected to the first channel configuration signal pin.

Based on step 101, the identifying of a UFP device is specifically as follows:

When an ID pin of a USB interface of the second device is grounded on a second device side, and when the resistance value of the equivalent resistor serially connected to the first channel configuration signal pin is a first resistance value, the first device identifies the second device as a UFP device. The first resistance value meets a criterion followed by the first device to identify a UFP device according to the USB Type-C protocol. It may be understood that the first resistance value is a resistance value of a first resistor R1.

The ID pin of the USB interface of the second device is grounded on the second device side. In this case, when the ID pin of the USB interface of the second device is electrically connected to the second USB interface of the adaption apparatus, an ID pin of the second USB interface of the adaption apparatus is grounded. In this way, the first resistor is serially connected between the first channel configuration signal pin of the first USB interface and the ID pin of the second USB interface, and pulls down the voltage of the first channel configuration signal pin, and the first device may identify the second device, inserted into the second USB interface of the adaption apparatus, as a UFP device according to the USB Type-C protocol.

Based on step 101, the identifying of a DFP device is specifically as follows:

When an ID pin of a USB interface of the second device is floating on a second device side, and when the resistance value of the equivalent resistor serially connected to the first channel configuration signal pin is a second resistance value, the first device identifies the second device as a DFP device. The second resistance value meets a criterion followed by the first device to identify a DFP device according to the USB Type-C protocol. It may be understood that the second resistance value is a sum of a resistance value of a first resistor R1 and a resistance value of a second resistor R2.

The ID pin of the USB interface of the second device is floating on the second device side. In this case, when the ID pin of the USB interface of the second device is electrically connected to the second USB interface of the adaption apparatus, an ID pin of the second USB interface of the adaption apparatus is floating. Therefore, the first resistor and the second resistor are serially connected between the first channel configuration signal pin of the first USB interface and a power signal pin VBUS of the second USB interface, and pull up the voltage of the first channel configuration signal pin, and the first device may identify the second device as a DFP device according to the USB Type-C protocol.

In the foregoing method, the first USB interface is a USB Type-C interface and may be electrically connected to the first device, and the second USB device may be electrically connected to the second device. Based on the connection relationship, the first resistor is serially connected between the first channel configuration signal pin of the first USB interface and the ID pin of the second USB interface, and the second resistor is serially connected between the ID pin of the second USB interface and the power signal VBUS of the second USB interface. In addition, the resistance value of the first resistor meets the criterion followed by the first device to identify a UFP device according to the USB Type-C protocol, and the sum of the resistance value of the first resistor and the resistance value of the second resistor meets the criterion followed by the first device to identify a DFP device according to the USB Type-C protocol. Therefore, when the adaption apparatus is electrically connected to the second device by using the second USB interface, and when the adaption apparatus is electrically connected to the first device by using the first USB interface, the first device identifies the second device as a UFP device or a DFP device based on the equivalent electrical parameter of the first channel configuration signal pin of the first device. Therefore, the adaption apparatus allows the first device to simultaneously identify a DFP device and a UFP device according to the USB Type-C protocol.

In addition, after identifying the second device as a UFP device, the first device acts as a DFP device and supplies power to the UFP device. After identifying the second device as a DFP device, the first device acts as a UFP device and displays prompt information about charging or data service transmission on a display screen of the first device.

In a process of actually using the adaption apparatus, there may be the following two operation sequences due to different manual operation habits. An operation sequence 1 is: The USB interface of the second device is first electrically connected to the second USB interface of the adaption apparatus, and then a USB interface of the first device is electrically connected to the first USB interface of the adaption apparatus. An operation sequence 2 is: A USB interface of the first device is first electrically connected to the first USB interface of the adaption apparatus, and then the USB interface of the second device is electrically connected to the second USB interface of the adaption apparatus.

For the operation sequence 1, the second device is directly identified according to the foregoing method. For the operation sequence 2, however, because the first USB interface of the adaption apparatus is first electrically connected to the USB interface of the first device, before the second USB interface of the adaption apparatus is electrically connected to the USB interface of the second device, the first device obtains a floating state of the first channel configuration signal pin. In a process of using the adaption apparatus, if the first USB interface of the adaption apparatus is first electrically connected to the USB interface of the first device, the first device obtains the floating state of the first channel configuration signal pin. In this case, the electrical connection between the first USB interface of the adaption apparatus and the USB interface of the first device does not affect the first device. Thereafter, after the second USB interface of the adaption apparatus is electrically connected to the USB interface of the second device, the first device identifies the second device according to the foregoing solution. However, if the USB interface of the second device is first electrically connected to the second USB interface of the adaption apparatus, and then the USB device of the first device is electrically connected to the first USB interface of the adaption apparatus, the first device directly identifies the second device according to the foregoing solution. Therefore, regardless of which interface of the adaption apparatus is first inserted into a corresponding peripheral device, identifying a DFP device and a UFP device by the first device according to the USB Type-C protocol is not affected.

An embodiment of this application provides a device identification apparatus, configured to execute the foregoing device identification method. The device identification apparatus may be a first device itself, or the device identification apparatus may be a function entity integrated into the first device. In the embodiments of this application, the device identification apparatus may be divided into functional modules according to the foregoing method example. For example, various functional modules corresponding to various functions may be obtained through division, or two or more functions are integrated into one processing module. The integrated module may be implemented in a form of hardware, or may be implemented in a form of a software functional module. It should be noted that module division in the embodiments of this application is schematic, and is merely logical function division. In actual implementation, another division manner may be used.

Figure 8:
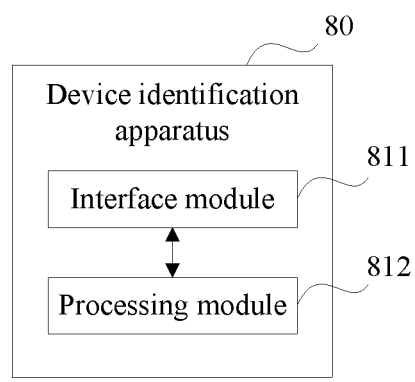
FIG. 8 is a schematic structural diagram of a device identification apparatus according to an embodiment of this application.

When division of various functional modules is corresponding to various functions, FIG. 8 shows a possible schematic structural diagram of a device identification apparatus 80 in the foregoing embodiments. The device identification apparatus 8 includes an interface module 811 and a processing module 812. The processing module 812 is configured to support the device identification apparatus in performing step 101. The interface module 811 is configured to support the device identification apparatus in implementing functions of a USB interface of a first device, for example, connecting to a first USB interface P1 of an adaption apparatus SW, and performing data transmission with a second device by using the adaption apparatus. All related content of all steps performed in the method embodiment may be cited as function description of corresponding functional modules, and details are not described herein again.

Figure 9:
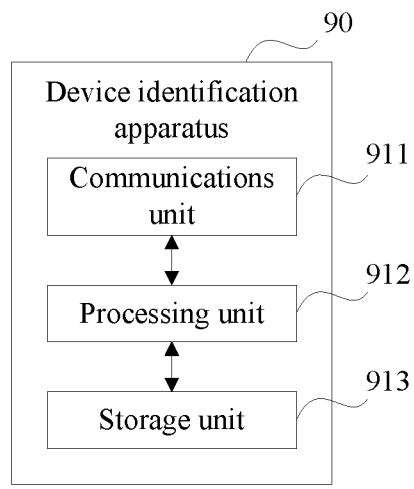
FIG. 9 is a schematic structural diagram of a device identification apparatus according to another embodiment of this application.

When an integrated unit is used, FIG. 9 shows a possible schematic structural diagram of a device identification apparatus 90 in the foregoing embodiments. The device identification apparatus includes a communications unit 911, a processing unit 912, and a storage unit 913. The processing unit 912 is configured to control and manage actions of the device identification apparatus, for example, the processing unit 912 is configured to support the device identification apparatus in performing process 101 in FIG. 5. The communications unit 911 is configured to support implementation of functions of a USB interface of a first device. In addition, the communications unit 911 includes a USB interface entity structure connected to a first USB interface of an adaption apparatus, for example, an interface circuit. The communications unit 911 is capable of communicating with a functional module or an entity structure connected to the communications unit 911, for example, connecting to the first USB interface P1 of the adaption apparatus SW, and performing data transmission with a second device by using the adaption apparatus. The storage unit 913 is configured to store program code and data of the device identification apparatus.

The processing unit 912 may be a processor or a controller. For example, the processing unit 912 may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware device, or any combination thereof. The controller/processor may implement or execute various example logical blocks, modules, and circuits described with reference to content disclosed in this application. Alternatively, the processor may be a combination implementing a computing function, for example, a combination of one or more microprocessors, or a combination of a DSP and a microprocessor. The communications unit 911 may be an interface circuit or the like. The storage unit 913 may be a memory.

When the processing unit 912 is a processor, the communications unit 911 is an interface circuit, and the storage unit 913 is a memory, the device identification apparatus in this embodiment of this application may be a device identification apparatus described in the following.

Figure 10:
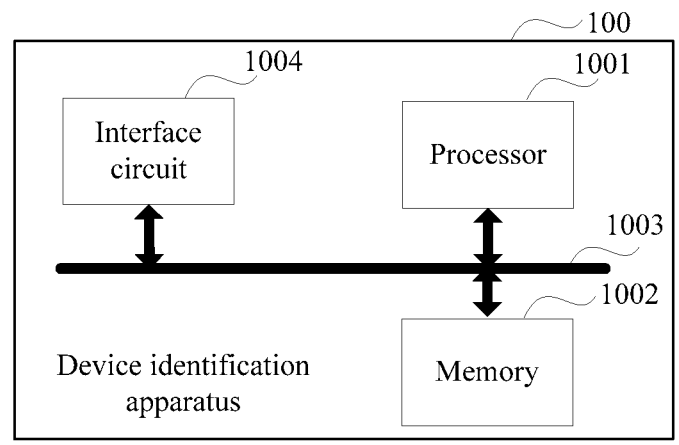
FIG. 10 is a schematic structural diagram of a device identification apparatus according to still another embodiment of this application.

As shown in FIG. 10, a device identification apparatus 100 includes a processor 1001, a memory 1002, a bus 1003, and an interface circuit 1004. The memory 1002 is configured to store a computer executable instruction. The interface circuit 1004, the processor 1001, and the memory 1002 are connected by using the bus 1003. When the device identification apparatus runs, the processor 1001 executes the computer executable instruction stored in the memory 1002, so that the device identification apparatus executes the foregoing device identification method. The bus 1003 may be a peripheral component interconnect (peripheral component interconnect, PCI) bus, an extended industry standard architecture (extended industry standard architecture, EISA) bus, or the like. The bus 1003 may be classified into an address bus, a data bus, a control bus, and the like. For ease of representation, only one thick line is used to represent the bus 1003 in FIG. 10, but this does not mean that there is only one bus or only one type of bus.

This embodiment of this application further provides a storage medium. The storage medium may include the memory 1002.

The device identification apparatus provided in this embodiment of this application may be configured to execute the foregoing device identification method. Therefore, for technical effects that can be achieved by the device identification apparatus, refer to the foregoing method embodiments, and details are not described herein again in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the scope of this application. Correspondingly, the specification and accompanying drawings are merely example description of this application defined by the accompanying claims, and are considered as any of or all modifications, variations, combinations or equivalents that cover the scope of this application. Obviously, a person skilled in the art can make various modifications and variations to this application without departing from the scope of this application. This application is intended to cover these modifications and variations provided that they fall within the scope of protection defined by the following claims and their equivalent technologies.

What is claimed is:

1. An adaption apparatus, the adaption apparatus comprising a first Universal Serial Bus (USB) interface and a second USB interface, wherein the first USB interface is a USB Type-C interface, wherein the first USB interface comprises a first power signal and a first channel configuration signal, and wherein the second USB interface comprises an identification (ID) signal and a second power signal;
   wherein the first power signal of the first USB interface is electrically connected to the second power signal of the second USB interface;
   wherein a first channel configuration signal of the first USB interface is electrically connected to the ID signal of the second USB interface using a first resistor;
   wherein the ID signal of the second USB interface is electrically connected to the second power signal of the second USB interface using a second resistor;
   wherein a resistance value of the first resistor meets a criterion followed by a first device to identify an upstream facing port (UFP) device according to a USB Type-C protocol;
   wherein a sum of the resistance value of the first resistor and a resistance value of the second resistor meets a criterion followed by the first device to identify a downstream facing port (DFP) device according to the USB Type-C protocol;
   wherein the first device comprising a USB Type-C interface;
   wherein the adaption apparatus is electrically connected to a USB interface of the first device using the first USB interface, wherein the adaption apparatus is electrically connected to a USB interface of a second device using the second USB interface, wherein the ID signal of the second USB interface is electrically connected to an ID signal of the USB interface of the second device using the adaption apparatus, and wherein the first device identifies the second device as a DFP device when the ID signal of the USB interface of the second device is floating on the second device;
   wherein the first device identifies the second device as a UFP device when the ID signal of the USB interface of the second device is grounded on the second device;
   wherein the resistance value of the first resistor is 5.1 KΩ, and wherein the resistance value of the second resistor is 51 KΩ; and
   wherein a second channel configuration signal of the first USB interface is floating, wherein the first channel configuration signal is a channel configuration signal of a USB Type-C interface in the USB Type-C protocol, and wherein the second channel configuration signal is a channel configuration signal of the USB Type-C interface in the USB Type-C protocol.

2. The adaption apparatus of claim 1, wherein:
   a first data signal of the first USB interface is electrically connected to a first data signal of the second USB interface; and a second data signal of the first USB interface is electrically connected to a second data signal of the second USB interface.

3. The adaption apparatus of claim 1, wherein the second USB interface comprises a micro-USB interface.

4. The adaption apparatus of claim 1, wherein the second USB interface comprises a mini-USB interface.

* * * * *